(12) United States Patent
Priotti

(10) Patent No.: US 8,625,807 B2
(45) Date of Patent: Jan. 7, 2014

(54) PAPR REDUCTION IN MULTI-CARRIER-CARRIER TRANSMISSION

(75) Inventor: Paolo Priotti, Turin (IT)

(73) Assignee: Telecom Italia S.p.A., Milan (IT)

( * ) Notice: Subject to any disclaimer, the term of this patent is extended or adjusted under 35 U.S.C. 154(b) by 94 days.

(21) Appl. No.: 13/126,983

(22) PCT Filed: Oct. 31, 2008

(86) PCT No.: PCT/IT2008/000683
§ 371 (c)(1),
(2), (4) Date: Apr. 29, 2011

(87) PCT Pub. No.: WO2010/049962
PCT Pub. Date: May 6, 2010

(65) Prior Publication Data
US 2011/0206207 A1    Aug. 25, 2011

(51) Int. Cl.
*H04L 1/02* (2006.01)
*H04K 1/04* (2006.01)

(52) U.S. Cl.
USPC .......................................... 380/287; 375/260

(58) Field of Classification Search
USPC .......................................... 380/287; 375/260
See application file for complete search history.

(56) References Cited

U.S. PATENT DOCUMENTS

| | | | | |
|---|---|---|---|---|
| 7,839,760 B2 * | 11/2010 | Yu et al. | | 370/204 |
| 8,259,773 B2 * | 9/2012 | Lee | | 375/130 |
| 2007/0291635 A1 * | 12/2007 | Yang et al. | | 370/208 |
| 2008/0101502 A1 * | 5/2008 | Navidpour et al. | | 375/296 |
| 2008/0285433 A1 * | 11/2008 | Akita et al. | | 370/204 |
| 2010/0086074 A1 * | 4/2010 | Chen et al. | | 375/267 |

FOREIGN PATENT DOCUMENTS

WO    WO-2004/054193 A2    6/2004

OTHER PUBLICATIONS

Ciochina, C., et al., "An Analysis of OFDM Peak Power Reduction Techniques for WiMAX Systems", IEEE International Conference on Communications, vol. 10, pp. 4676-4681, (Jun. 2006).
Haider, K., "Peak to Average Ratio Reduction in Wireless OFDM Communication Systems", Degree of Master of Science in Electrical Engineering, Blekinge Institute of Technology, Department of Telecommunications and Signal Processing, pp. 1-59 (Jan. 2006).
Muquet, B. et al., "Cyclic Prefixing or Zero Padding for Wireless Multicarrier Transmissions?", IEEE Transactions on Communications, vol. 50, No. 12, pp. 2136-2148, (Dec. 2002).
Ochiai, H., "On the Distribution of the Peak-to-Average Power Ratio in OFDM Signals", IEEE Transactions on Communications, vol. 49, No. 2, pp. 282-289, (Feb. 2001).

(Continued)

*Primary Examiner* — Kambiz Zand
*Assistant Examiner* — Aubrey Wyszynski
(74) *Attorney, Agent, or Firm* — Finnegan, Henderson, Farabow, Garrett & Dunner, L.L.P.

(57) ABSTRACT

A multi-carrier data communication is selectively operable in one of different communication modes which result in differently structured communication signals, the communication being configured for processing a data item intended to be transmitted to generate different transmission candidate data; selecting one of the transmission candidate data for transmission; selecting one of the communication modes based on the selected data item; and transmitting the selected data item using the selected communication mode.

18 Claims, 3 Drawing Sheets

(56) References Cited

OTHER PUBLICATIONS

Feng et al., "Embedding and Detection of Side Information for Peak-To-Average Power Ratio Reduction of an OFDM Dignal Using Partial Transmit Sequences," Vehicular Technology Conference, vol. 2, pp. 1354-1358, (2003).

Cimini et al., "Peak-To-Average Power Ratio Reduction of an OFDM Signal Using Partial Transmit Sequences With Embedded Side Information," IEEE Global Telecommunications Conference, pp. 746-750, (2000).

International Search Report from the European Patent Office for International Application No. PCT/IT2008/000683 (Mail date Sep. 17, 2009).

\* cited by examiner

PAPR REDUCTION IN MULTI-CARRIER-CARRIER TRANSMISSION

CROSS REFERENCE TO RELATED APPLICATION

This application is a national phase application based on PCT/IT2008/000683, filed Oct. 31, 2008.

TECHNICAL FIELD OF THE INVENTION

The present invention relates in general to radio communication systems based on multi-carrier radio transmission, and in particular to peak-to-average power ratio (PAPR) reduction in multi-carrier transmission.

BACKGROUND ART

As is known, in recent years a clear tendency to shift radio communications systems from single-carrier (SC) to multi-carrier (MC) transmission can be observed. There are several reasons for this paradigm shift, among which the following are worthy of mention:

- the necessity to cover wider bandwidths, which is related to augmented data-rate and improved robustness to multi-path fading, can be dealt with more simply by adopting MC transmission. Especially signal equalization can be performed in a largely more effective way in the frequency domain, subcarrier by subcarrier, than in the time domain, when a limited computation power is available;
- in multiple antenna systems it is easier to design a multiple input, multiple output (MIMO) receiver with good performance when working on transmission channels that are substantially frequency-flat. This can be achieved by properly choosing the subcarrier spacing in a MC transmission while it cannot be achieved in a wideband SC transmission;
- maximum spectrum efficiency implies a process of water-filling to determine bit and power allocation at the transmitter. Bit and power allocation are frequency variant quantities and easy to allocate in a MC transmission system. A water-filling process is instead hardly applicable to SC transmission systems, especially for what concerns bit allocation.

Given the availability of direct and inverse Fast Fourier Transform (FFT) processors, the majority of the MC transmission systems which are being developed for the communication mass market are based on Orthogonal Frequency Division Multiplexing (OFDM).

OFDM gives an easy way to equalize multi-path fading channels having a frequency band that can exceed 1 GHz in some systems (e.g. IEEE 802.15.3c) and makes MIMO transmission practical in cases where e.g. SC CDMA transmission would make it largely inapplicable. All of these advantages come to the expense of one IFFT and one FFT computation per data block, and a slight drop in frequency efficiency due to the insertion of a cyclic prefix (CP) before each symbol or a zero padding (ZP) after each symbol, which result in differently structured communication signals. For a detailed discussion of the CP and the ZP, reference may for example be made to Bertrand Muquet, Member, IEEE, Zhengdao Wang, Student Member, IEEE, Georgios B. Giannakis, Fellow, IEEE, Marc de Courville, Member, IEEE, and Pierre Duhamel, Fellow, IEEE, "Cyclic Prefixing or Zero Padding for Wireless Multicarrier Transmissions?" IEEE TRANSACTIONS ON COMMUNICATIONS, VOL. 50, NO. 12, DECEMBER 2002.

In general, CP and ZP communication modes are different techniques to ensure the same purpose, that is to introduce cyclicity in the received signal (after proper processing in the case of ZP) and to limit inter-block interference. Different communication modes might be used with the same above mentioned purpose, however remaining within the scope of the present invention.

For a single input, single output (SISO) OFDM system with N subcarriers, if the transmitted data after scrambling, channel coding, interleaving and mapping to a constellation is referenced by X (modulation symbol associated with a constellation point in a constellation diagram), the signal at the output of the IFFT may be mathematically expressed as follows:

$$x_{IFFT}(t) = \frac{1}{N} \sum_{n=0}^{N-1} X(n) e^{j2\pi nt/N}. \quad (1)$$

The set of N samples $x_{IFFT}(t)$, $t/T_S = 0 \ldots N-1$, where $T_S$ is the sampling period, constitutes the data part of one OFDM symbol. The final OFDM signal that after amplification is supplied to the transmitting antenna is a sequence of OFDM symbols, where a CP or ZP is inserted between different symbols.

When a CP with length G is used, transmitted data has the following form:

$$\underline{x}_{CP}(0), \underline{x}_{CP}(1), \underline{x}_{CP}(2), \ldots \quad (2)$$

where:

$$\underline{x}_{CP}(\Phi) = [x_{IFFT}(N-G+k), x_{IFFT}(N-G+1+k), \ldots$$
$$\ldots, x_{IFFT}(N-1+k), x_{IFFT}(k), x_{IFFT}(1+k), \ldots x_{IFFT}(N-1+k)], k=\Phi N \quad (3)$$

and $\Phi$ is zero or a positive integer.

When a ZP of length G is used, transmitted data has the following form:

$$\underline{x}_{ZP}(0), \underline{x}_{ZP}(1), \underline{x}_{ZP}(2), \ldots \quad (4)$$

where:

$$\underline{x}_{ZP}(\Phi) = [x_{IFFT}(k), x_{IFFT}(1+k), \ldots, x_{IFFT}(N-1+k), 0_1, 0_2, \ldots, 0_G], k=\Phi N \quad (5)$$

If the overall transmitted signal is referenced in both cases as x(t), then the received signal takes the following form:

$$r(t) = \sum_{l=0}^{\Delta-1} c_l(t) x(t-l) + n(t) \quad (6)$$

where $\Delta$ represents the delay spread of the channel, $c_l$ is the complex channel coefficient for the l-th path, and n is the noise.

CP or ZP are necessary to avoid interference in time between different OFDM symbols (which is effective when $\Delta < G$), and to ensure that the data sent to the FFT at the receiver are circularly shifted. This in turn is necessary because even small errors in symbol timing recovery can move the FFT window from its ideal position. However, if data is cyclically shifted, timing errors will simply result in a phase shift after FFT, which can typically be included and corrected in channel estimation and compensation.

When a ZP is used, to ensure cyclic shift it is necessary to perform the following block-wise operation at the receiver:

$$\tilde{r}_{ZP}(t) = \tilde{r}(0), \tilde{r}(1), \tilde{r}(2), \ldots \quad (7)$$

$$\tilde{r}(\Phi) = [r(k)+r(N+k), r(1+k)+r(N+1+k), \ldots, r(G-1+k)+r(N+G-1+k),$$

$$r(G+k), \ldots, r(N-1-k), r(N+k), r(N+1+k), \ldots, r(N+G-1+k)], k=\Phi N$$

When a CP is used, no operation is required and the received data can be directly sent to the FFT once that time synchronization point is decided:

$$r_{CP}(t) = r(t) \quad (8).$$

CP and ZP methods are basically equivalent as for transmission performance, as both use the same amount of time (channel occupancy overhead) to transmit redundant information.

Advantages of the CP method are:
it makes it available at the receiver a signal with high auto-correlation. Can be used for simple synchronization processing but is essentially useless when the system frame structure includes synchonization-specific information blocks (training and synchronization sequences); and
in certain cases, it might diminish the requirements on signal windowing to limit spectral re-growth at the transmitter.

Disadvantages of the CP method are:
the average radiated power and possible battery consumption are higher than in the ZP method. However, instantaneous maximum radiated power is the same as in the ZP method. Also the requirements on amplifier range and linearity are the same.

Advantage of the ZP method is:
it avoids transmission of useless signal section, such saving battery power and lowering average radiated power.

Disadvantages of the ZP method are:
it is not applicable if the receiver expects a received signal with auto-correlation peaks in coincidence of the CP (which might be the case for some OFDM systems); and
it needs processing at the receiver, although very simple, before FFT.

In general, the use of many different types of MC transmission, including OFDM, gives way to shortcomings concerning signal amplification. In systems where each subcarrier occupies a different frequency band, if each one has its own power amplifier (PA), the various signals can be seen as SC signals and as such the signal crest factor can be higher than 0 dB only due to the crest factor of the constellation, which is usually increased because of oversampling. The crest factor in such cases is typically limited below a few decibels, and signal power amplification is not particularly critical. On the contrary, in transmitting systems like OFDM, subcarriers overlap in frequency and the overall signal envelope is amplified by a single PA. Unluckily, as different subcarriers carry uncorrelated signals, there is always a non-zero probability that different subcarriers sum up coherently in a certain time instant. Overall, the OFDM envelope can vary noticeably in time. In the following, OFDM is used as a typical example of MC transmission, but the considerations provided apply also to different types of MC transmission.

The above issue is usually measured in terms of the squared crest factor, which is called Peak-to-Average Power Ratio (PAPR). A vast literature is available describing PAPR from OFDM, e.g. H. Ochiai, H. Imai "On the Distribution of the Peak-to-Average Power Ratio in OFDM Signals", IEEE 2001. In general, PAPR increases for increasing N, but PAPR is a complicated function of N. PAPR is additionally increased by constellation PAPR and oversampling, although the different PAPRs luckily do not sum up linearly, but less than linearly.

A high PAPR means the presence of instantaneous peaks in the signal envelope, which have an amplitude that can be tens of decibels above the average signal power. Real world PA devices have a limited range of input signals they can amplify with high linearity. Above a certain input amplitude, the PA is driven outside its linear region, causing distortion.

If no action is taken to lower PAPR, an OFDM signal, especially when having hundreds of subcarriers or more, and when having oversampling, will have a random distribution in time of peaks with different amplitudes, sometimes very high.

To try and amplify correctly the entire envelope of an OFDM signal, the designer is free to adopt a PA with a linear region much wider than the average signal level of OFDM. In other words, the designer can choose a PA with high input backoff. However, this means higher hardware cost, and is usually not acceptable for consumer products.

For this reason, it is better to try to reduce PAPR in the OFDM signal itself, so that a less expensive PA can be used. Historically, several types of solutions to overcome the PAPR issue in OFDM have been considered, most of which belong to the following categories:

a) clipping: in this case the signal is hard-limited below a certain threshold. Depending on the value of the threshold and on the PAPR value of the original signal, this process brings a certain degree of degradation in the link performance (typically an error floor). Moreover, clipping can cause signal re-growth outside the spectral mask, which is often unacceptable. A description of this technique may for example be found in US 2008/0101502, wherein an optimized clipping for peak-to-average power ratio reduction is disclosed. An optimized clipping pulse is generated which meets certain requirements, such as a spectral mask target or an error vector magnitude (EVM) target (expected standard deviation between signal constellation points before and after PAPR reduction), when applied to a signal;

b) using a certain fraction of the total subcarriers not to carry information data but to reduce the PAPR. This kind of solution inherently reduces spectral efficiency; in fact, it has been reported in the literature that the fraction of unusable subcarriers needed to appreciably lower PAPR is not negligible, e.g. 5 to 10% or more. Moreover, to guarantee a substantial reduction of PAPR, complicated iterative algorithms are necessary at the transmitter, having a computational load and/or delay that is unacceptable in most practical applications. A description of this technique may for example be found in Kamran Haider, "Peak to Average Ratio Reduction in Wireless OFDM Communication Systems", Degree of Master of Science in Electrical Engineering, Blekinge Institute of Technology, Department of Telecommunications and signal processing, January 2006;

c) phase rotation at the transmitter. In this case the phase of the subcarriers is rotated before IFFT according to a set of pre-determined sequences. IFFT processing is applied to all of the candidate OFDM symbols, and the one with lowest PAPR value is transmitted. The receiver tries to decode the possible OFDM symbols corresponding to all the sequences in a blind way, and can verify the correctness of a certain sequence when channel decoding of CRC-check is error free (blind detection). This technique produces a sustainable increase in the complexity of the transmitter due to multiple IFFTs that are to be performed in parallel, in contrast to the technique previously described in item b), but in general multiplies the complexity of the receiver by the number of sequences, which is not acceptable. Some variants of this technique try to signal what sequence has been used, but this reduces the number of subcarriers available for payload data. A description of this technique may for example be found either in the above-referenced "Peak to Average Ratio Reduction in Wireless OFDM Communication Systems" or in WO 2004/054193, wherein a scrambling-based peak-to-average power ratio reduction without side information is disclosed. One of a set of scrambling sequences is used at the transmitter which results in either a minimum or acceptable peak power. Rather than transmitting side information identifying which of the set of scrambling sequences was selected, the scrambling sequence is also applied to the cyclic redundancy check (CRC), and using syndrome detection the receiver is capable of determining which scrambling sequence was used at the transmitter and can proceed with the necessary de-scrambling. This solution, however, can be used only with a specified type of channel coding, that is in general not acceptable;

d) translation of constellation signals inside their decision region. According to this technique, the value of the constellation signals can be varied iteratively, provided that signals do not go outside their decision region, until the IFFT output converges to a solution having limited PAPR. The technique can be applied in particular to the external signals in constellations, bringing them towards an even more external position. However, this technique involves complex iterative computations as well as multiple IFFTs at the transmitter, and in general does not guarantee an appreciable reduction of PAPR. A description of this technique may for example be found in Cristina Ciochina, Fabien Buda and Hikmet Sari, "An Analysis of OFDM Peak Power Reduction Techniques for WiMAX Systems", IEEE International Conference on Communications, June 2006, vol. 10, pages 4676-4681.

OBJECT AND SUMMARY OF THE INVENTION

Although a vast literature of solutions is present, to the Applicant's knowledge no solution is such that no additional bandwidth is wasted, and at the same time PAPR is significantly reduced without requiring complex processing.

The objective of the present invention is therefore to provide an architecturally and implementationally simple solution to reduce PAPR in MC transmissions without affecting spectral efficiency.

This objective is achieved by the present invention in that it relates to a multi-carrier data communication system, as defined in the appended claims.

In broad outline, two sequences are used for phase scrambling of the transmitted symbols. At the transmitter, two IFFTs instead of one are performed, and, of the two resulting time-domain OFDM symbols, the one having the lower peak is chosen. This choice is based on the assumption that the average signal amplitude is the same for the two symbols, which is always true when the modulated data is the same, except for a phase change.

In combination with the choice of the scrambling sequence, the corresponding OFDM symbol is built up according to one of a plurality of different, selectable communication modes, e.g., either with a CP or a ZP. In this way, the transmitter is sending to the receiver information about what sequence it has used, but without waste of useful transmission resources. The transmission of control information embedded in the signal structure may be referred to as implicit signalling, thanks to which the receiver does not have to perform blind detection, so significantly saving receiver complexity in comparison with the solution under previous item c).

Thank to the different structures of the received communication signals, the receiver can easily and reliably distinguish between a communication signal having a CP and one having a ZP, based on received signal autocorrelation. As shown in the following detailed description, the absolute value of the signal autocorrelation goes above a certain threshold only when CP is present.

This solution provides a PAPR reduction around 3 dB with a reliability of 99% for a 4-times oversampled, 256-subcarrier SISO-OFDM system with QPSK constellation. Results are even better for higher-order constellations, and this significant result is obtained with a low complexity solution, when compared with the above-mentioned prior art techniques, or e.g. with the adoption of modulations like SC-FDMA. Taking as an application example 3GPP Long Term Evolution, the adoption of SC-FDMA instead of OFDM in the uplink and with concentrated resource allocation, would further reduce PAPR by only 1-3 dB, while giving possibly worse link performance and requiring the addition of one FFT at the transmitter and one IFFT at the receiver.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

Figure 1:
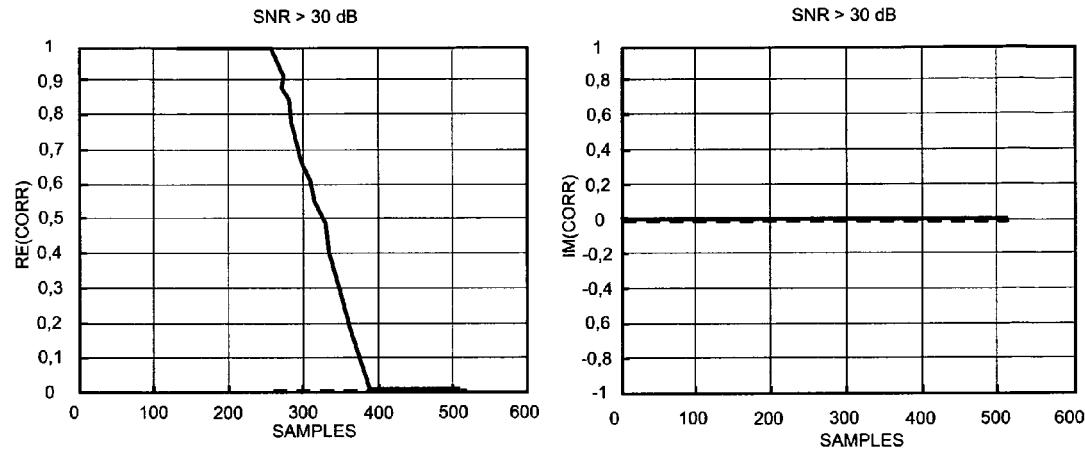
FIGS. 1 and 2 plot the simulated developments, versus the number of samples, of the real and imaginary parts of an autocorrelation function of an OFDM signal, in presence of a low and, respectively, a'high signal-to-noise ratio (SNR)

The following description is presented to enable a person skilled in the art to make and use the invention. Various modifications to the embodiments will be readily apparent to those skilled in the art, and the generic principles herein described may be applied to other embodiments and applications without departing from the scope of the present invention. Thus, the present invention is not intended to be limited to the embodiments shown, but is to be accorded the widest scope consistent with the principles and features disclosed herein and defined in the attached claims.

Besides, the present invention will now be described with reference to the OFDM system described via equations (1) to (8), and, for simplicity of notation, starting with a SISO transmission case, without loss of generality. In fact, the same description applies equally well to different MC transmission systems, as well as to MIMO systems where it is possible to adopt a CP or a ZP, as will be disclosed in the last embodiment.

When phase scrambling is applied at the transmitter, the resulting signal may be mathematically expressed as follows:

$$x_{IFFT}(t) = \frac{1}{N}\sum_{n=0}^{N-1} X(n)e^{j2\pi nt/N}, \ X(n) = d(n)s_\beta(n) \quad (1')$$

where the modulated data d(n) sent to the IFFT processing is multiplied by the n-th element $s_\beta(n)$ of the β-th scrambling sequence $S_\beta$, which has the following form:

$$S_\beta = [s_\beta(0), s_\beta(1), \ldots, s_\beta(N-1)] \quad (9)$$

PAPR for a signal that extends over $T_s$ sampling periods is defined as:

$$PAPR \triangleq \frac{\max_{0 \leq t < T_s} |x_{IFFT}(t)|^2}{Pot_{av}}. \quad (10)$$

Let's now consider, as an example, a first embodiment of the invention wherein β=2. The elements of the two sequences are pseudo-random numbers with different modules:

$$s_\beta(i) = \alpha_\beta(i) \cdot e^{j\phi\beta(i)}, \ 0 \leq i \leq N-1 \quad (11)$$

where α is a positive number, and φ is a random number uniformly distributed between $-\pi$ and $\pi$. In many practical implementations, α may be set to 1 so as to have a variable phase only. For the sake of simplicity, in the following α will be assumed to be unitary.

Let $PAPR_1$ be the PAPR value when using scrambling sequence $s_1$ and $PAPR_2$ the PAPR value when using $s_2$. It may be appreciated that one of the two scrambling sequences $s_1$ and $s_2$, but not both, may be unitary, namely made up of unitary scrambling elements (unitary modulus and zero phase), so resulting in a non-descrambling of the modulated data (X(n)=d(n)).

For the transmission of each OFDM symbol, the scrambling sequence $S_\beta$ is then selected such that:

$$\beta = \underset{\beta}{\operatorname{argmin}}(PAPR). \quad (12)$$

Moreover, it is chosen to transmit CP when β=1, and ZP otherwise, i.e. when β=2.

At the receiver, signal autocorrelation is evaluated where CP is expected to be found when present:

$$A(t) = \sum_{m=0}^{G-1} r(m+t)r^*(m+t+N), \ -\delta \leq t < G-1+\delta. \quad (13)$$

wherein G indicates the length of the CP, δ is the maximum timing error within the prescribed reliability limit (e.g. 99%), and the character "*" indicates the complex conjugate.

Instead of formula (13), power-normalized auto-correlation A(t) of the received signal can be used to guarantee more stable results for variable channel attenuation:

$$A(t) = \frac{\sum_{m=0}^{G-1} r(m+t)r^*(m+t+N)}{\left|\sum_{m=0}^{G-1} r(m+t+N)r^*(m+t+N)\right|} \quad (13')$$

Figure 2:
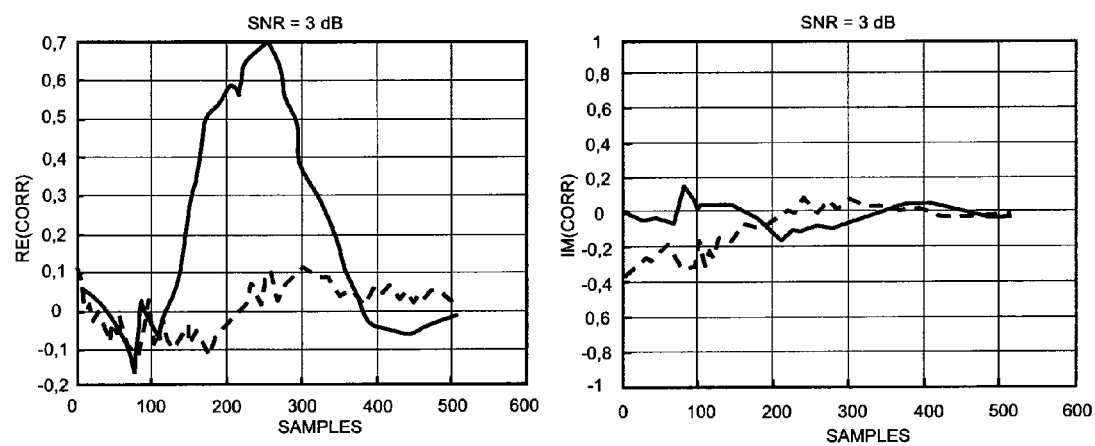

FIGS. 1 and 2 plot the simulated developments of the real (left) and imaginary (right) parts of the autocorrelation function A(t) of a received OFDM signal (512 subcarriers, CP length=128) versus the number of samples, in presence of the CP (continuous lines) and of the ZP (dotted lines), in a scenario with a high (>30 dB) and, respectively, low (3 dB) Signal-to-Noise Ratio (SNR).

At the receiver, presence or absence of the CP is detected by checking the following condition:

$$\exists \hat{t} \text{ such that } |A(\hat{t})| > \mu, \ -\delta \leq t < G+\delta \quad (14)$$

where μ is a suitable threshold value; for example, with 512 subcarriers and CP length=128, if formula (13') is applied, then a value for μ of 0.45 guarantees good performance down to about 0 dB SNR.

The skilled person will notice that formula (14) not only operates reliably under multi-path fading and very low SNR, but is substantially independent of residual frequency offsets (given they are constant on the symbol). Offsets would just alter the proportions between real and imaginary part of the auto-correlation.

When formula (14) is verified, then the estimate $\tilde{\beta}=1$, otherwise $\tilde{\beta}=2$. Signal FFT at the receiver is taken (see formulas (7) and (8)) on the data slot $r_{CP}(t)$ for G+k≤t<G+N+k, k=ΦN, or the data slot $r_{ZP}(t)$ for k≤t<N+k, k=ΦN. Here, the null time instant is defined as the perfect time synchronization point. If the data sent to the FFT are referenced by $r_{FFT}(t)$, the processing is as follows:

$$R_{FFT}(n) = \frac{1}{N}\sum_{t=0}^{N-1} r_{FFT}(t)e^{-j2\pi nt/N} \quad (15)$$

and phase descrambling works as follows:

$$R(n) = s_\beta^*(n)R_{FFT}(n) \quad (16).$$

At this point the PAPR reduction process is complete and other receiver operations can be performed, like de-interleaving and channel decoding.

The operation performed in (16) is sufficient to compensate for scrambling because the absolute value of each element of the scrambling sequence is assumed to be unitary. In case it is not unitary, a division by a becomes necessary.

Figure 3:
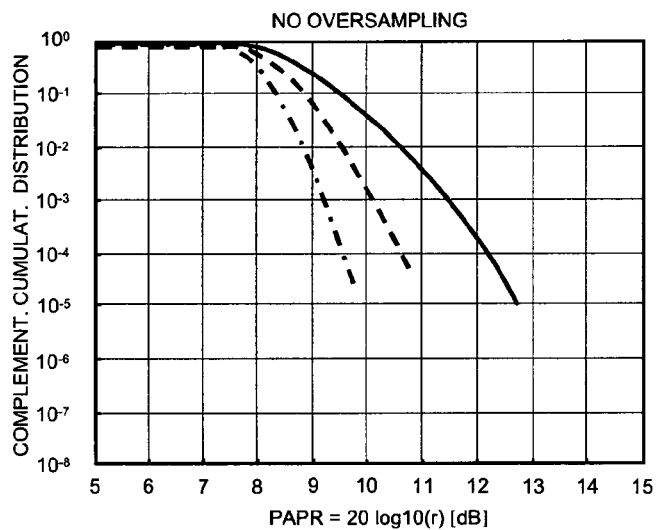
FIGS. 3 to 5 plot the simulated developments, versus the PAPR value, of different complementary cumulative distributions of a peak-to-average power ratio in an OFDM system with 512 subcarriers, obtained respectively without oversampling, with two-fold oversampling, and with four-fold oversampling.
Figure 4:
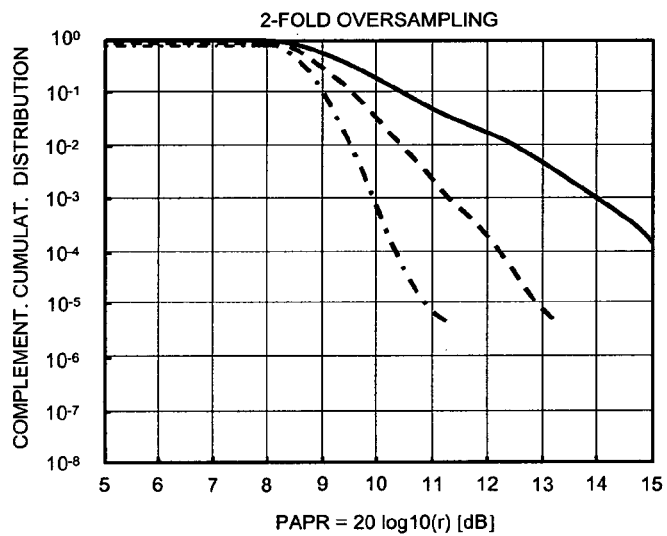
Figure 5:
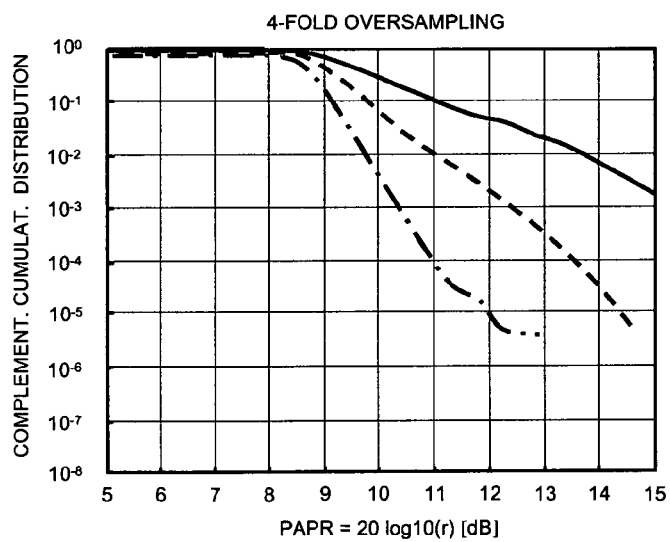

The effectiveness of this first embodiment in reducing the PAPR may be appreciated by looking at FIGS. 3 to 5, wherein simulated developments of different complementary cumulative distributions of the PAPR in an OFDM system with 512 subcarriers and obtained respectively without oversampling, with two-fold oversampling, and with four-fold oversampling are plotted. In these Figure, the continuous line curves relate to the original OFDM signal, the dotted line curves relate to the case of two scrambling sequences, and the dot-dashed line curves relate to the case of four scrambling sequences.

Figure 6:
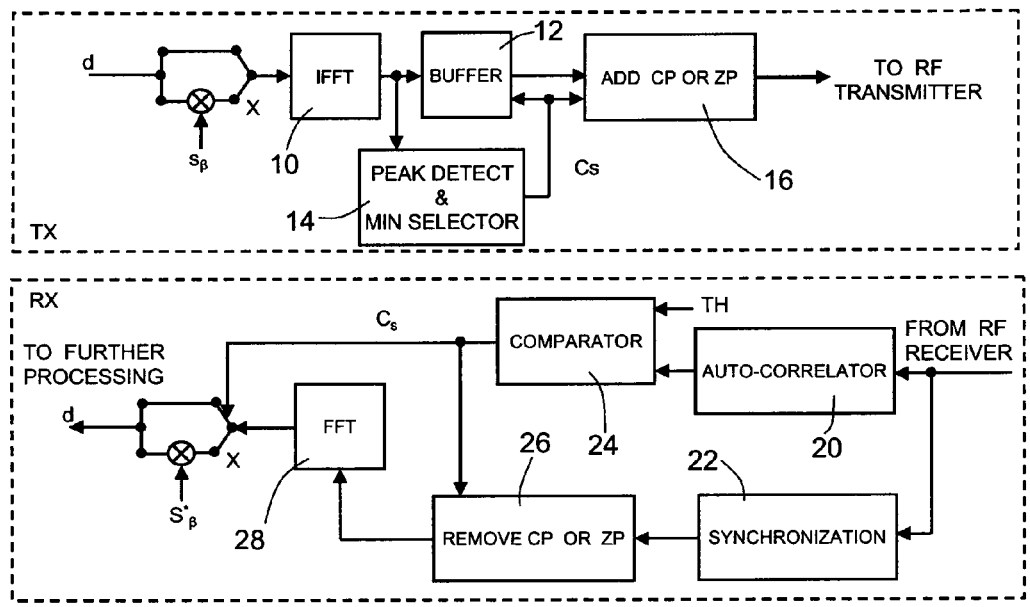
FIG. 6 shows a block diagram of those parts of a transmitter and a receiver featuring the present invention.

FIG. 6 shows a block diagram of those parts of a transmitter and a receiver of an MC communication system involved in the present invention. In particular, at the transmitter, modulated data d or scrambled modulated data X obtained by multiplying the modulated data d by the scrambling sequence $s_\beta$ are IFF transformed in a IFFT block 10, and the output data from the IFFT block 10 is supplied to both a buffer 12 and a peak detector and minimum selector 14, which selects the communication mode CP or ZP to be used for transmission and generates an appropriate control signal $C_S$ which, along with the buffered data from the buffer 12, is supplied to a block which is operable to implement the selected communication mode CP or ZP by adding the corresponding CP or ZP control symbols. In FIG. 6, a single IFFT block is provided. Should a dual (parallel) IFFT be provided, the buffer block in the transmitter becomes unnecessary.

At the receiver, the received data is supplied to both an auto-correlator 20, which computes the autocorrelation of the received data, and to a synchronizer 22. The computed autocorrelation is supplied to a comparator 24 which compares it with a threshold value Th to determine which communication mode CP or ZP has been adopted by the transmitter, so generating an appropriate control signal $C_S$. The synchronized received data from the synchronizer 22 is supplied, along with the control signal $C_S$, to a block 26 which removes the CP or ZP control symbols from the synchronized received data, so extracting the transmitted information data which is then FF transformed in an FFT block 28. If at the transmitter the modulated data d was not scrambled, then the output data from the FFT block 28 are supplied to the next stage of the receiver (not shown) for further processing known per se and hence not described in detail. If instead if at the transmitter the modulated data d was scrambled, then the output data from the FFT block 28 are descrambled by multiplying it by a conjugate scrambling sequence $s_\beta^*$.

Let's now consider, as a further example, a second embodiment of the invention wherein $\beta=2$, like in the first embodiment, and CP or ZP are applied so that decisions may be made based not on individual OFDM symbols, but on sequences of a certain number of consecutive OFDM symbols, hereinafter referred to as frame.

The invention may be applied directly to this case as well, defining formula (10) over one frame, and taking a decision via formula (12).

At the receiver, formula (14) can be applied to the autocorrelation of one OFDM symbol only, belonging to the frame, or it can be applied to the function that is the autocorrelation averaged over two or more OFDM symbols. In case of averaging over L consecutive OFDM symbols, formula (13) becomes:

$$A(t) = \frac{1}{L}\sum_{l=0}^{L-1}\sum_{m=0}^{G-1} r[m+t+l(N+G)]r^*[m+t+N+l(N+G)] \quad (13'')$$

If necessary, power normalization can be adopted also in this case, similarly to formula (13').

In this second embodiment, the performance is similar to that of the first embodiment, and the PAPR reduction tends to become smaller as frame length increases.

Implementation of this second embodiment is similar to the first embodiment shown in FIG. 6, provided that the buffer can accommodate a whole frame instead of simply one OFDM symbol.

The same principle of the previous embodiments can be applied both to MIMO (Multiple-Input Multiple-Output) systems and to MISO (Multiple-Input Single-Output) systems, where the decision of what phase scrambling sequence is to be used is taken jointly based on the OFDM symbols sent on multiple antennas.

Therefore, let's finally consider, as a yet further example, a third embodiment of the present invention, wherein the inventive principle is applied to a MIMO system with $M_T$ transmitting antennas and $M_R$ receiving antennas. A MISO system is a particular case of a MIMO system where $M_R=1$.

Let the data payload transmitted on the p-th transmit antenna be defined, similarly to formula (1'), as:

$$x_{IFFT,p}(t) = \frac{1}{N}\sum_{n=0}^{N-1} d_p(n)s_\beta(n)e^{j2\pi nt/N} \quad (17)$$

In formula (17), it may be immediately appreciated that the same scrambling sequence is used for all the transmitting antennas.

Let the PAPR value associated with a single antenna defined as:

$$PAPR_p = \frac{\max_{0 \le t < T_s}|x_{IFFT,p}(t)|^2}{Pot_{av}} \quad (18)$$

then, the maximum PAPR on all antennas is:

$$PAPR_{tot} = \max_{p=0\ldots M_T-1}(PAPR_p) \quad (19)$$

and the scrambling sequence is chosen based on:

$$\beta = \underset{\beta}{\mathrm{argmin}}(PAPR_{tot}). \quad (20)$$

At the receiver, exactly the same processing as for the SISO case can be applied to determine if CP or ZP has been transmitted.

The overall received signal on the q-th receive antenna is:

$$r_q(t) = \sum_{p=0}^{M_T-1}\sum_{l=0}^{\Delta-1} c_l^{pq}(t)x_p(t-l) + n(t) \quad (21)$$

and formulas (13) or (13'), (14), (15), (16) can be applied to formula (21) in the same way as to the SISO signal. It is not necessary to repeat the decision process for each receive antenna: just one antenna may be enough to reliably detect the presence of the CP. The joint use of the signals from multiple antennas can still be useful in situations of extreme interference or very low SNR to improve detection reliability. In fact, if autocorrelation is averaged on more than one receive antenna, spatial diversity will be present.

More sophisticated embodiments can decide what phase scrambling sequence to use not only based on the maximum value of the PAPR but on the two or three top values and so on. In a broader meaning, it is better to consider the distribution of the PAPR peak values deriving from a certain sequence, more than just the maximum value.

In particular, the choice of the phase scrambling sequence may alternatively be based on more than one signal peak, on the peak distribution, or on the simulated receiver behaviour.

As for the choice of the phase scrambling sequence based on more than one peaks, in formula (12) $\beta$ at the transmitter was chosen so that formula (10) is minimized over the considered interval. Instead of the PAPR defined by formula (10), an effective PAPR that is a function of the whole signal in the considered interval may be defined as follows:

$$PAPR_{eff,1} \triangleq f\left(\frac{|x(t)|^2}{Pot_{av}}\right), 0 \leq t < T_s \quad (10')$$

A practical example for the choice of the function $f$ is the average of w values of the argument, namely:

$$PAPR_{eff,2} \triangleq \frac{\sum_{j=1}^{w} |x(t_j)|^2}{w \cdot Pot_{av}}, 0 \leq t < T_s \quad (10'')$$

where the instants $t_j$ correspond to the w peak values.

Figure 7:
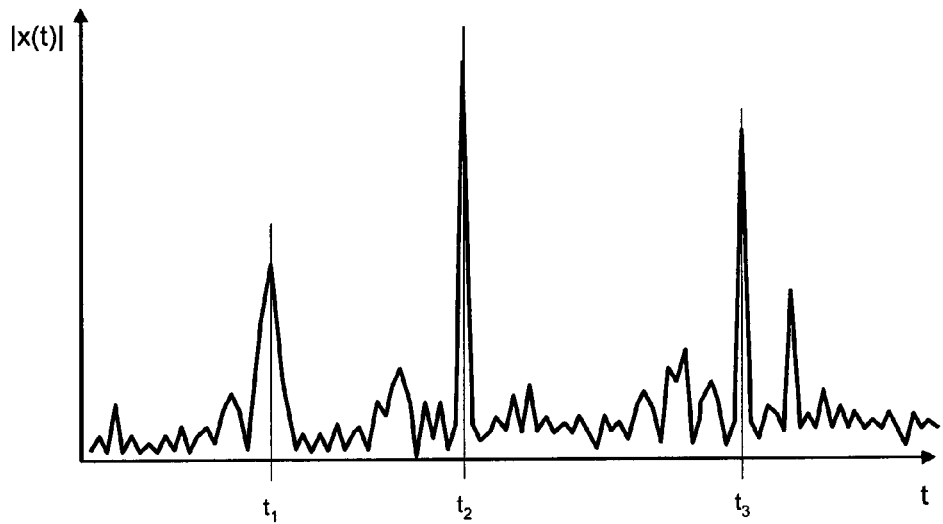
FIG. 7 plots the time development of a typical multi-carrier discrete-time signal.

As an example, FIG. 7 plots a typical multi-carrier discrete-time signal x(t) vs. time, where w=3 (i.e., the three highest values assumed by the time-domain signal x(t) at the time instants $t_1$, $t_2$ and $t_3$ in the considered interval).

As for the choice of the phase scrambling sequence based on peak distribution, an extension of the previous concept is to collect the observed density function of the various peaks in the signal in the considered interval, and take a decision on β based on the density. The decision might be based on parameters like the maximum value of the distribution or, more likely, on the set of right-most values.

Finally, as for the choice of the phase scrambling sequence based on simulated receiver behaviour, assuming that the computational complexity at the transmitter is irrelevant and that the transmitter has knowledge of the channel seen by the receiver and the SNR at the receiver input, it is then possible to simulate at the transmitter, the transmission with all the possible choices of β, and then to take decisions on β based on simulation results. Then, looking at the result of the channel decoding in the various cases, although it relates to noise realizations that are not the same ones as the receiver would actually experience, the simulations averagely lead to the choice of the best β, which takes into account the whole distribution of the peaks in the signal.

The advantages of the present invention are evident from the foregoing description. In particular, the present invention provides an architecturally and implementationally simple solution to reduce PAPR in MC transmissions without affecting spectral efficiency.

Finally, it is clear that numerous modifications and variants can be made to the present invention, all falling within the scope of the invention, as defined in the appended claims.

The invention claimed is:

1. A multi-carrier data communication system selectively operable in one of a cyclic prefix (CP) communication mode and a zero padding (ZP) communication mode, which communication modes result in differently structured communication signals, the system configured for:
    processing a data item intended to be transmitted to generate at least two different transmission candidate data;
    selecting one of the transmission candidate data for transmission;
    selecting one of the CP and ZP communication modes based on the selected data item; and
    transmitting the selected data item using the selected communication mode,
    wherein selecting one of the transmission candidate data for transmission comprises:
        for each transmission candidate data item, computing a quantity indicative of an associated Peak-to-Average Power Ratio (PAPR); and
        selecting the transmission candidate data item with the lowest Peak-to-Average Power Ratio (PAPR).

2. The system of claim 1, wherein processing the data item intended to be transmitted comprises:
    scrambling the data item intended to be transmitted to compute at least one scrambled data item; and
    wherein selecting one of the transmission candidate data for transmission comprises:
        selecting one of the data items intended to be transmitted and the at least one scrambled data item.

3. The system of claim 2, wherein scrambling the data item intended to be transmitted to compute at least one scrambled data item comprises:
    scrambling the data item using at least one scrambling data item.

4. The system of claim 3, wherein selecting one of the communication modes based on selected data item comprises:
    associating a communication mode with the at least one scrambling data item;
    when the selected data item is the at least one scrambled data item, selecting the communication mode associated with the at least one scrambling data item used to compute the selected data item; and
    when the selected data item is the data item intended to be transmitted, selecting a different communication mode with which no scrambling data item is associated.

5. The system of claim 4, wherein processing a data item intended to be transmitted comprises:
    scrambling the data item intended to be transmitted to generate different scrambled data; and
    wherein selecting one of the transmission candidate data for transmission comprises:
        selecting one of the different scrambled data.

6. The system of claim 5, wherein scrambling the data item intended to be transmitted to compute different scrambled data comprises:
    scrambling the data item using different scrambling data.

7. The system of claim 6, wherein selecting one of the communication modes based on the selected data item comprises:
    associating each communication mode with a corresponding scrambling data item; and
    selecting the communication mode based on the scrambling data item used to compute the selected data item.

8. The system of claim 1, wherein transmitting the selected data item using the selected communication mode comprises:
    inverse fast Fourier transforming the selected data item to generate a corresponding time-domain signal.

9. The system of claim 8, wherein computing a quantity indicative of an associated Peak-to-Average Power Ratio (PAPR) for each transmission candidate data item comprises:
    computing a quantity based on the corresponding time-domain signal.

10. The system of claim 3, wherein the data item intended to be transmitted is a group of modulation symbols each associated with a constellation point in a constellation diagram relating to a modulation scheme, and wherein scrambling data are such as to modify a phase and/or a modulus of each modulation symbol.

11. The system of claim 1, wherein selecting one of the transmission candidate data based on the computed quantities comprises:
   selecting the transmission candidate data item with the lowest computed quantity.

12. The system of claim 1, wherein the multi-carrier data communication system is an orthogonal frequency division multiplexing (ODFM) communication system.

13. The system of claim 1, wherein processing the data item further comprises
   receiving a communication signal;
   processing the communication signal to determine the communication mode used for transmission and to extract the transmitted data item; and
   determining the data item intended to be transmitted based on the extracted data item and the communication mode used for transmission.

14. The system of claim 13, wherein selecting the one of the plurality of communication modes used for transmission based on the selected data item comprises:
   computing an autocorrelation function of the received communication signal;
   comparing the evaluated autocorrelation function with a threshold value; and
   determining the communication mode used for transmission based on the outcome of the comparison.

15. The system of claim 13, wherein processing the communication signal to extract the transmitted data item comprises:
   fast Fourier transforming the received communication signal.

16. The system of claim 13, wherein determining the data item intended to be transmitted based on an extracted data item and the communication mode used for transmission comprises:
   associating each communication mode with a corresponding scrambling data item;
   determining if and, if so, which scrambling data item is associated with the communication mode used for transmission;
   if no scrambling data item is associated with the communication mode used for transmission, determining that the data item intended is the extracted data item; and
   if a scrambling data item is associated with the communication mode used for transmission, descrambling the extracted data item using the determined scrambling data item.

17. A transmitter configured to selectively operate in one of a cyclic prefix (CP) communication mode and a zero padding (ZP) communication mode, which communication modes result in differently structured communication signals, the transmitter configured to:
   process a data item intended to be transmitted to generate at least two different transmission candidate data;
   select one of the transmission candidate data;
   select one of the CP and ZP communication modes based on the selected data item; and
   transmit the selected data item using the selected communication mode wherein selecting one of the transmission candidate data for transmission for transmission includes:
      for each transmission candidate data item, computing a quantity indicative of an associated Peak-to-Average Power Ratio (PAPR); and
      selecting the transmission candidate data item with the lowest Peak-to-Average Power Ratio (PAPR).

18. A multi-carrier data communication method for use in a multi-carrier cata communication system selectively operable in one of a cyclic prefix (CP) communication mode and a zero padding (ZP) communication mode, which communication modes result in differently structured communication signals, comprising:
   processing a data item intended to be transmitted to generate at least two different transmission candidate data;
   selecting one of the transmission candidate data for transmission;
   selecting one of the CP and ZP communication modes based on the selected data item; and
   transmitting the selected data item using the selected communication mode,
   wherein selecting one of the transmission candidate data for transmission includes:
      for each transmission candidate data item, computing a quantity indicative of an associated Peak-to-Average Power Ratio (PAPR); and
      selecting the transmission candidate data item with the lowest Peak-to-Average Power Ratio (PAPR).

* * * * *